Dec. 19, 1967     H. SCHUCHARDT     3,358,337

HOSE CLAMP

Filed July 20, 1966

United States Patent Office 3,358,337
Patented Dec. 19, 1967

3,358,337
HOSE CLAMP
Helmut Schuchardt, 18 Im Holze,
318 Wolfsburg, Germany
Filed July 20, 1966, Ser. No. 566,670
Claims priority, application Germany, July 24, 1965,
Sch 37,435
9 Claims. (Cl. 24—27)

ABSTRACT OF THE DISCLOSURE

A hose clamp for clamping a hose onto a pipe. The hose clamp includes a springy, ring-shaped member having a pair of overlapping free gripping ends which cross each other at a predetermined location. This ring-shaped member has an inner diameter which in an unstressed condition of the ring-shaped member is smaller than the outer diameter of the hose which is to be clamped. Opposite to its free gripping ends, the ring-shaped member has a curved section of approximately semicircular configuration, while between this section of approximately semicircular configuration and the free gripping ends there are a pair of quarter-circle limbs from which the free ends respectively extend. These quarter-circle limbs respectively have radii of curvature which cross each other at a straight line which is perpendicular to a tangent to the free ends at the predetermined location where they cross each other. The approximately semicircular section of the ring-shaped member has a center of curvature which is situated on the latter straight line at a given distance from a second straight line which extends perpendicularly across the first straight line and which interconnects the centers of curvature of the quarter-circle limbs. The center of curvature of the approximately semicircular section is situated between this second straight line and the section of approximately semicircular configuration, so that from the ends of the section of approximately semicircular configuration to the quarter-circle limbs there are transition portions of the ring-shaped member which serve to elongate the latter slightly in the direction of the first straight line which is perpendicular to the tangent to the free ends at the above predetermined location.

---

The present invention relates to hose clamps.

More particularly, the present invention relates to that type of hose clamp which takes the form of a springy, ring-shaped member which is adapted to surround a hose at the exterior thereof so as to clamp the hose against a pipe, for example, which extends into the interior of the hose.

In general, the present invention relates to a type of hose clamp which has a pair of overlapping free gripping ends which cross each other and which are opposed to an approximately semicircular section of the hose clamp and which includes a pair of opposed quarter-circle limbs extending from the free gripping ends, respectively, toward the approximately semicircular section of the clamp. This clamp has in its unstressed condition an inner diameter which is smaller than the outer diameter of the hose which is to be clamped.

This smaller inner diameter of the hose clamp with respect to the outer diameter of the hose which is to be clamped provides with known hose clamps of this general type the clamping action when the clamp has been spread and then placed on the hose so as to engage the latter. However, with the known structures there is a lack of uniform pressure of the clamp against the surface of the hose since it is not possible to spread the gripping ends of the clamp apart from each other in such a way as to provide a uniform increase in the diameter of the clamp.

During the spreading of the known clamps, they become deformed only at a central portion of the semicircular section which is opposed to the free gripping ends of the clamp, so that there is only a more or less limited engagement of the clamp with the hose at the central region of the semicircular portion thereof and at the opposed gripping ends thereof. It is particularly in the region of the gripping ends of the known clamps that they press strongly into the hose and deform the hose at the region of the gripping ends of the clamp in an excessive manner.

There are already known hose clamps which have structures intended to avoid this drawback, such as clamps where the radius of the semicircular section is approximately 30–45% of the outer diameter of the hose, while the radii of the quarter-circle sections correspond to the outer diameter of the hose. With such a construction all of these radii extend from points which are situated in a common plane. However, a hose clamp of this construction does not provide a uniform pressure against the surface of the hose throughout the entire circumference thereof, especially with hoses having different outer diameters. Inasmuch as with this construction also it is only the central region of the semicircular section which becomes deformed upon spreading of the clamp, and furthermore inasmuch as in the unstressed condition of the clamp the distance between the free gripping ends thereof and the central region of the semicircular section is still substantially smaller than the outer diameter of the hose, this construction also results in excessive pressing of the gripping ends of the clamp into the hose wall.

With these known constructions the free gripping ends of the clamp shift appreciably in lateral directions when the clamp-spreading tool is removed from the latter. This action also takes place in the case where the exterior diameter of the hose is equal to twice the radius of each quarter-circle limb. A uniform transmitting of the gripping force by way of the quarter-circle limbs onto the exterior surface of the hose is thus to a great extent prevented with this construction. In the event that the exterior diameter of the hose is smaller than twice the radius of each quarter-circle limb of the clamp, then as a result of the larger inner diameter of the clamp the quarter-circle limbs thereof in this case also will have only a more or less limited engagement with the hose. Engagement throughout the entire lengths of the quarter-circle limbs of the clamp is thus not possible with this particular type of diameter differential.

With another type of known hose clamp the semicircular section which is opposed to the gripping ends is itself divided into a pair of quarter-circle sections which have, respectively, radii of curvature which cross each other. With this construction all of the centers of curvature are situated along a common straight line which is situated nearer to the semicircular section than a line extending centrally between the location where the gripping ends cross each other and the crest of the semicircular section. This particular type of construction intends to provide even in the semicircular section a configuration which assumes as closely as possible the ideal form of a circle even when the clamp is spread. In fact, however, with this construction there is in the unstressed condition of the clamp a sharp bend or kink at the region of the crest of the semicircular section, and it is precisely at this region that very considerable peaks of stressing forces occur during spreading of the clamp. These peak forces do not result in a uniform unbending of the sharp bend at the central part of the semicircular region, but instead, particularly with brittle materials, the result is breaking of the clamp at this point. In the event that the clamp does not actually break, the sharp bend remains to a very large extent at its original configuration even during spreading of the clamp, so that this particular type of clamp does not engage the hose at the crest region of the semicircular section of the clamp.

It is, accordingly, a primary object of the present invention to provide a hose clamp which will avoid all of the above drawbacks of the known clamps.

In particular, it is an object of the present invention to provide a hose clamp which will provide around the entire circumference of the hose a pressure of the clamp against the surface of the hose which is as uniform as possible.

It is furthermore an object of the present invention to provide a hose clamp which is capable of achieving this latter object even in the case where the outer diameters of different hoses differ considerably from each other, even though a clamp of the same size is used with such hoses.

With the clamp of the present invention the center of curvature of the approximately semicircular section of the clamp which is opposed to the crossing, free gripping ends thereof is situated on a straight line which is perpendicular to a tangent to the clamp at the location where the free gripping ends thereof cross each other. The centers of curvature of the quarter-circle limbs are situated on opposite sides of this latter straight line and are situated in a second straight line which extends perpendicularly across this first-mentioned straight line, and in accordance with the invention the center of curvature of the approximately semicircular section is spaced from this latter second straight line by a predetermined distance, this latter center of curvature being situated between the second straight line and the semicircular section of the hose clamp of the invention.

The invention is illustrated by way of example in the accompanying drawings which form part of this application and in which.

Figure 1:
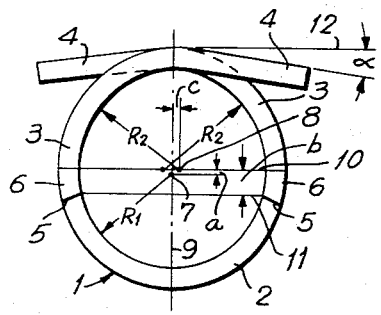
FIG. 1 shows in side elevation the hose clamp of the present invention in its unstressed condition, FIG. 1 additionally illustrating the geometrical relationships between the different portions of the hose clamp.

The hose clamp 1 which is shown in FIG. 1 has an approximately semicircular section 2 and a pair of quarter-circle limbs 3 which extend integrally from the free, overlapping gripping ends 4 of the clamp, so that the quarter-circle limbs 3 respectively form extensions of the free gripping ends 4. The approximately semicircular section 2 has a radius of curvature $R_1$ while the quarter-circle limbs 3 respectively have equal radii of curvature $R_2$ which cross each other in the manner illustrated in FIG. 1. The center of curvature 7 of the approximately semicircular section 2 is situated on a straight line 9 which extends perpendicularly with respect to a tangent 12 which is tangent to the free gripping ends 4 at the place where the latter cross each other. This center of curvature 7 of the approximately semicircular section 2 is situated at a distance $a$ from a second straight line 10 which extends perpendicularly across the straight line 9 and in which the centers of curvature 8 of the quarter-circle limbs 3 are located. It is to be noted that the center of curvature 8 of the left limb 3 of FIG. 1 is situated on the right side of the line 9 while the center of curvature 8 of the right limb 3 of FIG. 1 is situated on the left side of the line 9, and furthermore the radii $R_2$ intercept each other at the line 9. The center of curvature 7 is situated between the line 10 and the approximately semicircular section 2.

Because of the distance $a$ by which the center of curvature 7 is displaced from the line 10 toward the approximately semicircular section 2, the clamp of the invention has intermediate sections 6 extending in the general direction of the line 9 and corresponding in length to the distance $a$. The result is that the clamp includes transition regions 5 between the radius of curvature $R_1$ on the one hand, and the radii of curvature $R_2$ on the other hand. These transition regions are situated on the same side of the center of curvature 7 as the approximately semicircular section 2, so that the straight line 11 which interconnects the transition regions 5 is situated at a distance $b$ from the line 10, as indicated in FIG. 1. As a result the intermediate sections 6 are lengthened and the section 2 does not extend through a complete semicircle. It is for this reason that this section 2 is referred to as being only approximately semicircular. The approximately semicircular section 2 extends around the center 7 through an angle of approximately 160–170°.

The centers of curvature 8 of the quarter-circle limbs 3 are respectively situated at distances $c$ from the straight line 9, as shown for the right center of curvature 8 in FIG. 1. The distance $a$ has a magnitude of approximately 5–10% of the radius $R_1$ of the approximately semicircular section 2. In those hose clamps of the invention which are commercially marketed, the distance $a$ is on the order of 1 mm.

The distance $c$ has a magnitude of approximately 5–10% of the radius $R_2$ of each quarter-circle limb 3. This distance, in the commercial clamp which is actually sold is on the order of 1.25 mm. The radius $R_1$ of the approximately semicircular section 2 is on the order of 10–20% less than one half the outer diameter of the hose which is to be clamped, and this difference between the radius of the outer surface of the hose which is to be clamped and the radius $R_1$ is approximately 2 mm. in the commercially sold clamps of the invention. The radii $R_2$ of the quarter-circle limbs are also smaller than the radius of curvature of the exterior surface of the hose which is to be clamped, but the radii $R_2$ are on the order 5–15% longer than the radius $R_1$, the difference between the radii $R_1$ and $R_2$ in the commercially sold clamp being on the order of approximately 1.5 mm.

As may be seen from FIG. 1, the elongated, free gripping ends 4 of the clamp are respectively inclined from the location where they cross each other toward the opposed approximately semicircular section 2, and as a result these free ends 4 are displaced from the tangent 12 by an angle $\alpha$ which can be anywhere between 2° and 12° but which preferably is on the order of 8°. As a result of this latter angular displacement of the free gripping ends 4 with respect to the tangent 12, there is a uniform introduction of forces into the clamp of the invention when it is spread, and the result is a uniform spreading of the clamp of the invention along its entire circumference.

Figure 2:
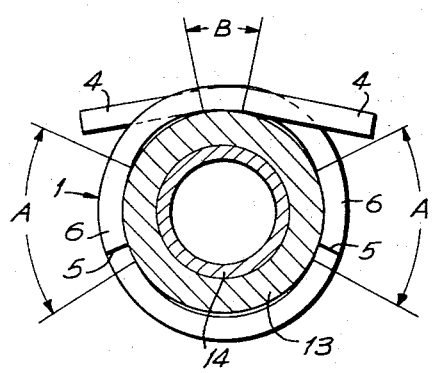
FIG. 2 shows in a schematic and exaggerated manner, so as to provide a clearer understanding of the invention, the hose clamp of the invention engaging a hose.

The operation of the clamp of the invention and its gripping relationship with respect to a hose clamped thereby are illustrated in FIG. 2. FIG. 2 shows a pipe 14 introduced into a hose 13 which is to be clamped to the pipe 14 with the clamp of the invention. It is assumed that the outer diameter of the hose 13 corresponds to the geometric relationships for which the particular clamp of the invention is designed. In this case there are regions A of relatively high specific surface pressure at the intermediate sections 6 and the transition regions 5 adjoining the latter. Also there is a relatively high specific surface pressure at the region B where the gripping ends 4 overlap and cross each other. In the regions situated between the regions A and B the surface pressure diminishes. However, it is to be understood that an approximately uniform distribution of the pressure around the entire circumference of the hose will result because of the compensating action of the elastic material of the hose. The particular relationship illustrated in FIG. 2 according to which in those regions intermediate the regions A and B the clamp is out of contact with the hose 13 is shown only for the sake of explaining the invention and does not occur in practice. In the actual construction the clamp presses into the wall of the hose at its exterior surface not only at the regions A and B but also at those regions where the clamp is shown in FIG. 2 spaced from the outer surface of the hose, this action taking place because of the elasticity of the hose wall.

In the event that the outer diameter of the hose is smaller than the ideal diameter for the particular clamp, there will of course be a lesser pressure at the regions A between the surface of the hose and the clamp, since as a result of this relationship the tendency of the approximately semicircular section 2 to engage the hose in the regions of the transition portions 5 becomes smaller. However, in this case the region B of higher surface pressure becomes enlarged, so that there is still a uniform distribution of the pressure around the entire hose circumference, even in this case.

Figure 3:
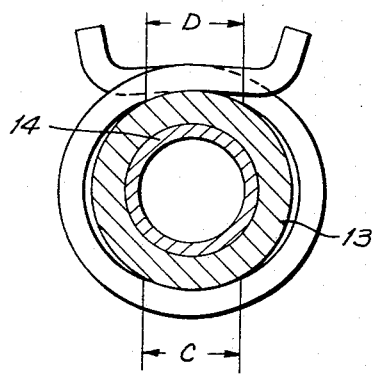
FIG. 3 shows the manner in which one known hose clamp structure operates.

FIG. 3 illustrates in an exaggerated manner, corresponding to the illustration of FIG. 2, the manner in which a known hose clamp engages a hose, in the case where the inner diameter of the clamp is in general smaller than the outer diameter of the hose. As is indicated in FIG. 3, there are relatively small regions C and D where the higher surface pressure is provided. The regions between the regions C and D which have very little if any surface pressure are extremely large. However, at the region D where the gripping ends of the clamp are located, these gripping ends dig to a considerable extent into the wall of the hose, and these gripping ends shift laterally with respect to the hose during the clamping of the hose by the clamp shown in FIG. 3.

Figure 4:
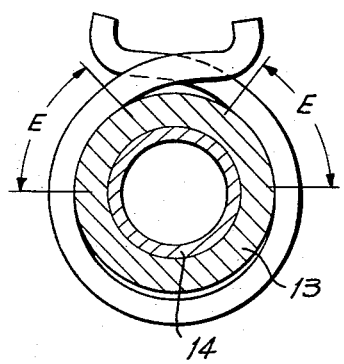
FIG. 4 illustrates the manner in which another known hose clamp structure operates.

FIG. 4 shows the clamping relationship of another type of known hose clamp where the centers of curvature of the quarter-circle limbs and the semicircular section are all situated on a common straight line corresponding to the line 10 of FIG. 1. With this construction the radii of the quarter-circle limbs correspond to the radius of curvature of the exterior surface of the hose. As may be seen from FIG. 4, there is in this case also regions of engagement E of relatively high specific pressure between the clamp and the hose, these regions E being situated adjacent the free gripping ends of the clamp, although the regions E could be situated somewhat closer to the transition regions of the clamp. Inasmuch as the distance between the gripping ends of the clamp and the central part of the semicircular opposed section thereof is substantially smaller than the outer diameter of the hose, there is in this case also a very pronounced pressing of the clamp into the hose wall. The compensating intermediate regions of the clamp of the invention are lacking, inasmuch as all of the centers of curvature are situated on a common straight line. As a result of the relatively large radii of the quarter-circle limbs, the clamp of FIG. 4 can act in such a way that there is no adequate clamping action in the region of the outermost portions of the gripping ends of the clamp. Thus, there is a further drawback with the construction of FIG. 4 in that there is relatively little engagement of the clamp with the hose in the region of the gripping ends of the clamp, and this drawback is avoided with the clamp of the invention by the inclination of the gripping ends 4 at the angle α with respect to the tangent 12, as described above.

As a result of the displacement of the center of curvature of the approximately semicircular section 2 by the distance $a$ with respect to the line 10, as pointed out above, the intermediate sections 6 are created, these intermediate sections following in their curvature the curvature of the quarter-circle limbs 3. As a result, with the structure of the invention during spreading of the clamp there is initially a sufficient deformation at the central region of the approximately semicircular section 2, with the result that in the gripping condition this central region of the semicircular section 2 as well as the transition regions 5 engage the hose with a uniformly distributed gripping force. Thus, with the structure of the invention there is not, as is the case with certain known structures, a premature pressure of the clamp against the hose in the region of the free gripping ends of the clamp, with the result that the gripping ends dig undesirably into the hose with a resulting improper gripping in the region of the transition portions. Instead, with the structure of the invention the quarter-circle limbs have a uniform gripping action with respect to the hose not only in the region of the gripping ends but also in the region of the intermediate sections 6, so that in the intermediate regions there is a very good distribution of the surface pressure.

Furthermore, the clamp of the present invention presents the advantage of achieving a uniform distribution of the pressure of the clamp circumferentially along the surface of the hose even in the case where the outer diameter of the hose is above or below the particular diameter for which the particular clamp is designed, the surface pressure being maintained over relatively large regions even in these cases. In the event that the outer diameter of the hose is smaller than the diameter for which the clamp is designed, there is still a sufficient gripping force because of the fact that the inner diameter of the clamp is smaller than that of the hose for which it is designed. On the other hand, if the outer diameter of the hose is greater than that for which the clamp is designed, then the displacement of the center of curvature of the approximately semicircular region 2 by the distance $a$ as referred to above with the resulting gaining of the intermediate sections 6 still guarantees engagement of the clamp with the hose at several locations, namely at the transition regions between the semicircular section and the quarter-circle limbs, in the intermediate or central portion of the semicircular section, and in the region of the gripping ends, so that from these regions the gripping force will spread out circumferentially around the clamp and around the hose to provide a uniform gripping pressure circumferentially around the hose.

As has been indicated above, the distance $a$ is on the order of 5–10% of the radius $R_1$. For those clamps which are sold commercially, it is possible to use commercially sold hoses whose outer diameters range between 10 and 60 mm., and for hose sizes in this latter range the distance $a$ can be 1 mm. for this latter entire range of hose sizes.

As has been indicated above, the distance $c$ is approximately 5–10% of the radius $R_2$, and for hoses which are commercially sold and which have outer diameters ranging between 10 and 60 mm. the value of the distance $c$ can be on the order of 1.25 mm., as indicated above.

By extending the intermediate sections 6 all the way up to the transition regions 5, there is a compensating action for the deformation of the clamp during spreading thereof. It is this feature which of course provides an approximately semicircular section 2 which extends only through an angle 160–170°, as pointed out above.

In order to achieve a sufficient prestressing, the radius $R_1$ of the approximately semicircular section 2 can be on the order of 10–20% less than one half the outer hose diameter. With the above referred to range of hose sizes available on the market, the difference between the radius $R_1$ and the radius of the exterior surface of the hose is on the order of 2 mm., as also pointed out above.

While the radii $R_2$ of the quarter-circle limbs are indeed smaller than the radius of curvature of the exterior surface of the hose, these radii are nevertheless approximately 5–15% longer than the radius $R_1$ so that the difference between the radii $R_2$ and $R_1$ with the commercially sold clamps is on the order of 1.5 mm.

In order to introduce the spreading force to expand the clamp and in order to achieve a uniform deformation of the clamp during the spreading thereof, the particular arrangement of the free gripping ends where they extend tangentially with respect to the line 12 is of great advantage. As was indicated above, the angle α may range from approximately 2° up to 12°, but is preferably 8°.

What is claimed is:

1. A hose clamp comprising a springy, ring-shaped member having a pair of overlapping free gripping ends which cross each other at a predetermined location, said member having an inner diameter which in an unstressed condition of said member is smaller than the outer diameter of a hose to be clamped by said member, and said member having opposed to said free gripping ends thereof a section of approximately semicircular configuration and between said approximately semicircular section and said free gripping ends a pair of quarter-circle limbs from which said free ends respectively extend, said limbs respectively having radii of curvature which cross each other at a straight line which is perpendicular to a tangent to said free ends at said predetermined location where they cross each other, and said approximately semicircular section having a center of curvature situated on said straight line at a given distance from a second straight line extending perpendicularly across said first-mentioned straight line and interconnecting the centers of curvature of said quarter-circle limbs, and said center of curvature of said approximately semicircular section being situated between said second straight line and said section of approximately semicircular configuration.

2. A hose clamp as recited in claim 1 and wherein said given distance of said center of curvature of said approximately semicircular section from said second straight line is on the order of 5-10% of the radius of curvature of said approximately semicircular section.

3. A hose clamp as recited in claim 1 and wherein said centers of curvature of said quarter-circle limbs are respectively situated on opposite sides of said first-mentioned straight line at distances therefrom which are respectively on the order of 5-10% of the radii of curvature of said quarter-circle limbs.

4. A hose clamp as recited in claim 1 and wherein said quarter-circle limbs respectively extend beyond said second straight line and cross a third straight line parallel to said second straight line and including the center of curvature of said approximately semicircular section and then merging smoothly into said approximately semicircular section.

5. A hose clamp as recited in claim 1, said ring-shaped member having in a clamping position a given diameter, and wherein the radius of curvature of said approximately semicircular section is approximately 10-20% less than one half said given diameter of the ring-shaped member in its clamping position.

6. A hose clamp as recited in claim 1 and wherein the radii of curvature of said quarter-circle limbs are each approximately 5-15% longer than the radius of curvature of said approximately semicircular section.

7. A hose clamp as recited in claim 1 and wherein said free gripping ends of said member extend substantially tangentially from portions of said member which adjoin said free gripping ends thereof, respectively.

8. A hose clamp as recited in claim 7 and wherein each of said free gripping ends is angularly displaced from said tangent to the location where said ends cross each other by an angle of approximately 2-12°, and said gripping ends being situated between said tangent and said section of approximately semicircular configuration.

9. A hose clamp as recited in claim 8 and wherein said angle of displacement of each gripping end with respect to said tangent is approximately 8°.

References Cited

UNITED STATES PATENTS

| | | | |
|---|---|---|---|
| 2,472,172 | 6/1949 | Ovens et al. | |
| 2,180,271 | 11/1939 | Arras | 24—27 X |
| 2,793,414 | 5/1957 | Arras | 24—27 |
| 3,008,206 | 11/1961 | Meese et al. | 24—27 |
| 3,208,120 | 9/1965 | Kliss | 24—27 |

JAMES L. JONES, JR., *Primary Examiner.*